United States Patent [19]
Grunenwald

[11] 3,926,099
[45] Dec. 16, 1975

[54] METHOD OF AND DEVICE FOR DISINFECTING THE AIR EXTRACTED FROM THE ISOLATED INTERIOR OF AN AMBULANCE

[75] Inventor: Karl Grunenwald, Lorch, Germany
[73] Assignee: Binz & Co., Lorch, Germany
[22] Filed: July 24, 1974
[21] Appl. No.: 491,246

[30] Foreign Application Priority Data
July 30, 1973 Germany............................ 2338601

[52] U.S. Cl................ 98/2.05; 237/12.3 C; 21/111
[51] Int. Cl.².......................................... B60H 1/00
[58] Field of Search .................. 98/2, 2.05; 21/111; 296/19; 237/12.3 C; 128/145 R

[56] References Cited
UNITED STATES PATENTS

| | | | |
|---|---|---|---|
| 1,830,658 | 11/1931 | Hynes ........................... | 237/12.3 C |
| 1,839,879 | 1/1932 | Hyatt ............................ | 237/12.3 C |
| 3,174,277 | 3/1965 | Hettich ......................... | 237/12.3 C |
| 3,656,462 | 4/1972 | Bailey ........................... | 98/2.05 |
| 3,861,590 | 1/1975 | Kofnik .......................... | 237/12.3 C |

FOREIGN PATENTS OR APPLICATIONS 2,151,434   4/1973   Germany ................................. 98/2

*Primary Examiner*—John J. Camby
*Assistant Examiner*—Henry C. Yuen

[57] ABSTRACT

A method and apparatus for disinfecting the air of the isolated interior of an ambulance, wherein the air is extracted and utilized to burn a fuel in a hot water heater unit connected to the coolant circuit of the engine of the ambulance, the heater unit being normally supplied with fresh air but with the extracted air when the interior of the ambulance is to be disinfected.

9 Claims, 1 Drawing Figure

U.S. Patent  Dec. 16, 1975  3,926,099
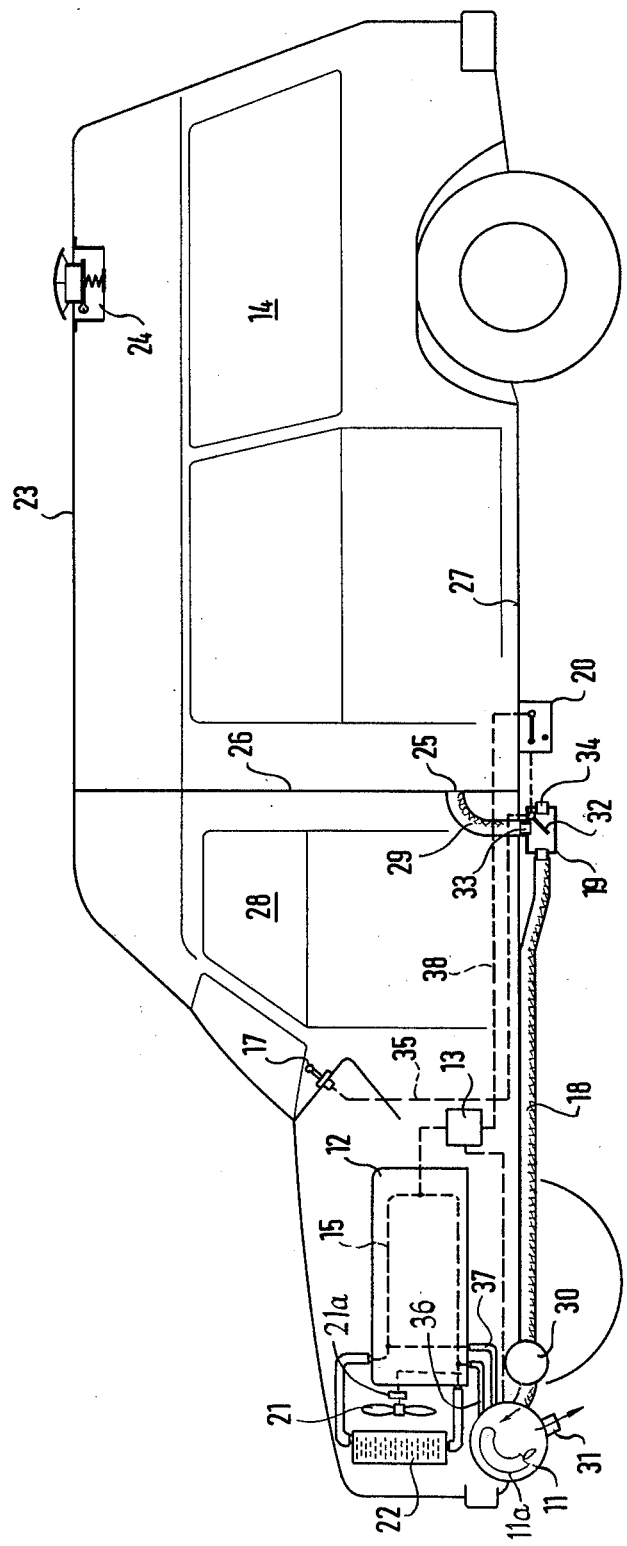

METHOD OF AND DEVICE FOR DISINFECTING THE AIR EXTRACTED FROM THE ISOLATED INTERIOR OF AN AMBULANCE

The present invention relates to a method of disinfecting the air extracted from the isolated interior of an ambulance, in which the extracted air is employed to burn a fuel in a heater unit.

It is already well known German Printed Application 2,151,434, published Apr. 19, 1973, to extract air from the largely sealed interior of an ambulance and to apply it to the combustion chamber of a conventional vehicle heating system. By extracting the air from the interior, a slight vacuum is produced in the latter which prevents the air from escaping to the exterior through small leakage points. Any leaks result in fresh outside air being drawn into the interior of the ambulance. Because the air extracted from the ambulance interior is completely burned in the vehicle heating system, it is ensured that all bacteria or bacilli contained in the air are killed before being released to the atmosphere following combustion.

A disadvantage of the known isolation ambulance is that for disinfection purposes, to heat the combustion air the vehicle must be continuously heated and this is something which is highly unpleasant when operation under summer conditions is involved.

The object of the invention, therefore, is to provide a method of and a device for ensuring continuous and reliable heating of the air extracted from the ambulance interior without heating up said interior or the adjoining vehicle cab.

To resolve this problem, the invention provides that for combustion the hot water heating unit is employed which is connected to the cooling circuit of the engine. In this fashion the surplus heat developed in the combustion operation can be liberated to the engine cooler and thus dissipated to the atmosphere. Consequently, it is unnecessary to operate the vehicle heating system in order to prevent the heater unit from overheating. Instead, the unit which is provided in the vehicle anyway, namely the normal engine cooler, is additionally exploited to dissipate the heat developed by the disinfection operation. Preferentially, the automatic heater cut-out will be automatically rendered inoperative when disinfection is taking place. In other words, water heater units connected to the cooling circuit of an engine normally have an automatic cut-out which comes into operation whenever the engine reaches its operating temperature, the engine maintaining that temperature because of its own inherent heating. In accordance with the invention, this automatic system is disconnected when the ambulance driver initiates the measures required for disinfection. Then, although an unnecessarily large amount of heat is developed and dissipated into the environment, this is something, which, because of the rarity with which patients having infectious diseases are transported, can be accepted without any difficulty. For example, ambulances for carrying patients with infectious diseases are intended for the transportation of people who have caught smallpox, this being an extremely rare occurrence.

A preferred embodiment is one in which the heater unit is normally supplied with fresh air and is only supplied with air from the ambulance interior, in the situation where disinfection is needed. This has the advantage that heated air is not continuously being extracted from the ambulance interior and having to be replaced by cold air supplied from the exterior. Instead, heating and ventilation of the ambulance interior can normally be performed completely independently of the air supply to the heater unit. It is only in the disinfection situation that the ventilation system of the ambulance interior is coupled to the heater supply.

Coveniently, when switching from fresh air supply to air from the ambulance interior, the automatic cut-out of the heater unit will automatically be put out of service.

A further advantageous embodiment is one in which the engine itself is supplied with the air extracted from the ambulance interior, by way of combustion air. In this case, then, the heat normally developed in the cylinder chambers of the engine, is used to kill the bacteria and bacilli, thus, the engine itself then constitutes the hot water heater unit.

A preferred isolation ambulance for the implementation of the procedure described hereinbefore, with a hot water heater unit which can extract air from the sealed interior of the ambulance and use it to burn the fuel, is characterised in accordance with the invention in that the hot water heater unit is connected to the engine coolant circuit. Hot water heater units connected to the engine coolant circuit are well known per se; in accordance with the invention, the use of this kind of heater unit however, acquires a special significance because it is used not solely to preheat or additionally heat the coolant circuit but at the same time to burn bacteria or bacilli, the surplus heat being used not to heat up the engine or to heat the vehicle, but instead being dissipated to the exterior through the vehicle cooler.

If the heater unit is controlled by an automatic cut-out which responds to the temperature in the coolant circuit, then a manually operable switch is provided which is connected to the automatic cut-out and enables the latter to be disconnected. In this fashion, the result is achieved that the hot water heater unit operates no longer as a heater unit in fact, but as a bactericidal unit, the surplus heat supplied supplied to the vehicle cooler.

In a particularly advantageous practical embodiment, in the heater unit air induction line, a changeover valve is connected which makes it possible arbitrarily to induce fresh air or air from the ambulance interior. The changeover valve will conveniently be operated by a manual control. Preferentially, the changeover valve will be coupled to an electrical switch itself connected to the automatic cut-out. Then, the vehicle dashboard for example, need merely be provided with a switch for operating the changeover valve. The disconnection of the automatic cut-out is then effected automatically because of the preferably mechanical coupling between the changeover valve and the said electrical switch.

It is particularly advantageous if the vehicle cooler is equipped with a thermostatically controlled auxiliary blower of the kind well known in the vehicle context. An auxiliary blower of this kind, however, is particularly convenient in an isolation ambulance in accordance with the invention because when disinfection is involved, particularly high loads are imposed upon the cooler.

In accordance with a convenient embodiment, the hot water heater unit is the engine itself, to the induction manifold of which latter the ambulance interior can be connected. In a case of this kind, a special hot water heater unit would be unnecessary.

In the roof of the ambulance interior, advantageously a non-return valve will be arranged which only opens and allows fresh air to enter from the exterior, at a predetermined vacuum level in the ambulance interior. This measure, compared with the conventional arrangement of a ventilator in the roof of the ambulance interior, constitutes an essential advantage to the extent that communication is only opened when a vacuum is developed. For this reason, the escape of the air inside the ambulance interior, to the outside through the air inlet orifice, is effectively prevented.

The heater unit should be located as far forward as possible in the vehicle and preferably in the neighborhood of the cooler so that there is a relatively long air feed line from the ambulance interior to the heater unit. Because of this design, the inclusion of a non-return valve in the air induction line is unnecessary because blow back of the flame from the burner of the heater unit to the ambulance interior is excluded due to the length of the air line.

In accordance with the invention, the induction orifice is arranged in the front wall of the ambulance interior, shortly above the floor. Thus, although it is at the lowest possible level, it is not actually in the floor itself because it would interfere with the cleaning of the ambulance interior and could also become fouled.

The non-return valve will preferably be arranged in the rear third of the roof of the ambulance interior so that in association with the induction orifice arranged in the front wall, good ventilation of the interior is ensured at all times.

The invention will be described in the following by way of example, making reference to the drawing, the single FIGURE in which shows a schematic side elevation of an ambulance in accordance with the invention for carrying patients with infectious diseases, only those parts essential to the invention having been shown, and this in a purely schematic form.

In accordance with the drawing, the isolation ambulance in accordance with the invention has an interior 14 for carrying the patients, and a driver's cap 28 which can be sealed off from same. The interior 18 is largely hermetically sealed vis-a-vis the environment, by careful sealing of windows and doors.

In the front wall 26 of the ambulance interior 14 in the neighbourhood of the floor 27, an induction orifice 25 is provided which, through a line 29, leads to a changeover valve 19 arranged beneath the vehicle, close to the opening 25, which valve in turn is connected through an induction line 18 to the air feed side of the hot water heater unit 11. In the induction line 18 a blower 30 is arranged which extracts the air from the ambulance interior 14 and injects it into the hot water heater unit 11 for combustion by a burner 11a. Through an exhaust 31, the combustion gases enter the atmosphere.

The changeover valve 19 has a butterfly 32 enabling orifices 33, 34 to be selectively placed in communication with the induction line 18. Through the orifice 33, air is drawn from the ambulance interior 14, and through the orifice 34 outside air is induced. The butterfly 32 of the changeover valve will preferentially be placed in one or the other of its terminal positions, by a bowden cable arrangement 35 operated by a control 17 on the vehicle dashboard. The hot water heater unit 11 is connected through two lines 36, 37 to the coolant circuit 15 of the vehicle engine 12 indeed in such a fashion that for example through the line 36 heated water is supplied and through the line 37 cooler water for heating.

Also, in the normal fashion, to the coolant circuit 15, the cooler 22 of the vehicle is connected. A blower 21 controlled by a thermostat 21a in response to the temperature of the water leaving the cooler 22 via line 36, enables forced cooling of the cooler 22 to be effected.

The operation of the heater unit 11 is controlled by an automatic cut-out 13 which responds to the temperature of the coolant circuit. The connection of the automatic cut-out 13 with the coolant circuit and the heater unit 11 is indicated by broken lines. As soon as the coolant circuit 15 reaches a specific temperature, the automatic cut-out 13 automatically disconnects the heater unit 11.

In accordance with the invention, the automatic cut-out 13 is connected through a link 38 with a switch 20 which is in turn mechanically connected to the valve butterfly 32, so that depending upon the position of the said butterfly 32, it occupies one of its two terminal positions.

If the butterfly 32 is in front of the orifice 33 so that fresh air is induced through the orifice 34 of the changeover valve 19, then the switch 20 will be in a position such that the automatic cut-out 13 operates normally.

As soon as the control 17 on the dashboard 16 is operated to correspond with the disinfection situation, so that the butterfly 32 is moved into position in front of the orifice 34, the switch 20 is automatically placed in its other terminal position so that the automatic system 13 is disconnected. The heater unit 11 now operates continuously so that destruction of bacteria or bacilli contained in the air from the ambulance interior, is reliably ensured.

In the roof 23 of the ambulance interior 14, there is also a non-return valve 24 which only opens at specific vacuum level in the ambulance interior and thus enables external air to penetrate into said interior 14.

If, for some reason or other, the vacuum in the ambulance interior 14 should fill or for some reason a vacuum should develop outside the vehicle, the non-return valve 24 would immediately close and prevent the exit of contaminated air from the interior 14.

In a very much simplified embodiment, the induction line 18 could be connected directly to the induction manifold of the engine 12. In this case, the automatic cut-out 13 and the heater 11 would no longer be needed.

The mode of operation of the ambulance in accordance with the invention, for carrying infectious patients is as follows:

Normally, the butterfly 32 is in the position in which it closees off the orifice 33 so that with the heater unit 11 running fresh air is induced through the orifice 34. The automatic cut-out 13 disconnects the heater unit 11 whenever, because the coolant circuit 15 has reached a suitable temperature, it is not needed. The heater unit 11 also supplies heaters in the vehicle cab 28 and the ambulance interior 14, which heaters can be disconnected in a manner which has not been shown.

In the disinfection situation, the control 17 is operated so that the orifice 34 is then closed and the orifice 33 is connected to the induction line 18. At the same time, through the switch 20 the automatic cut-out 13 is rendered inoperative. The heating unit 11 now operates continuously and surplus heat is dissipated through the coolant circuit 15 to the cooler 22 where it is conveyed to the exterior.

I claim:

1. An ambulance comprising: an engine, a coolant circuit associated with said engine, a hot water heater unit, means for extracting air from the sealed interior of said ambulance and for feeding said extracted air for use in the combustion of a fuel to said heater unit, said hot water heater unit being connected to said coolant circuit, automatic cut-out means connected to said heater unit for rendering the same selectively effective and ineffective, said cut-out means responding to the temperature of the coolant in said coolant circuit, a manually operable switch connected to said automatic cout-out means for rendering the same ineffective, an air induction line leading from said air extracting means to said heater unit, and a change-over valve for selectively admitting outside air and air from said ambulance interior to said induction line.

2. An ambulance according to claim 1, comprising: means connected to said change-over valve for manually controlling the same.

3. An ambulance according to claim 2, comprising: an electrical switch connected to said change-over valve and said automatic cut-out means.

4. An ambulance according to claim 1, comprising: a blower associated with said coolant circuit, and means for thermostatically controlling said blower.

5. An ambulance according to claim 1, wherein said hot water heater unit is said engine, said ambulance interior being connected to the induction manifold of said engine.

6. An ambulance as claimed in claim 1, comprising: a non-return valve in the roof of said ambulance interior, said valve being operable to open at a predetermined vacuum level in said ambulance interior to allow fresh air into said interior.

7. An ambulance as claimed in claim 1, wherein said heater unit is arranged in the vicinity of said coolant circuit.

8. An ambulance according to claim 1, wherein said means for feeding air from said interior to said heater unit is arranged in the front wall of said ambulance interior adjacent to the floor of said ambulance.

9. An ambulance as claimed in claim 6, wherein said non-return valve is arranged in the rear third of the roof of the ambulance interior.

* * * * *